G. H. TRÉMOLIÈRES.
PISTON LUBRICATION.
APPLICATION FILED JULY 1, 1911.

1,030,213.

Patented June 18, 1912.

UNITED STATES PATENT OFFICE.

GUSTAVE HENRI TRÉMOLIÈRES, OF NEUILLY-SUR-SEINE, FRANCE.

PISTON LUBRICATION.

1,030,213. Specification of Letters Patent. Patented June 18, 1912.

Application filed July 1, 1911. Serial No. 636,463.

*To all whom it may concern:*

Be it known that I, GUSTAVE HENRI TRÉMOLIÈRES, a citizen of the French Republic, residing at 81 Avenue du Roule, Neuilly, Seine, in the French Republic, have invented certain new and useful Improvements in Piston Lubrication, of which the following is a specification.

The piston of a motor or of a pump is generally provided with extensible segments which insure a good joint for the chamber in which the fluid which acts in or passes through the said motor or pump circulates. Owing to the provision of these segments the whole of the lubricant which is distributed in the cylinder during the descent of the piston is forced during its ascent and is unable to circulate beyond the hermetic partitions constituted by these segments. It follows that this same quantity of lubricant gradually becomes converted into a thick substance which no longer fulfils the conditions of lubrication required but on the contrary constitutes a frictional agent capable of stopping the action of the pump or motor completely. When pistons comprise segments intermediate between those at their extremities, as the latter force the lubricant on either side of the piston, these intermediate segments never receive the action of the said lubricant, become hot, bind and if they do not produce the complete stoppage of the motor or pump, they frequently increase the size of the bore of the cylinder by attacking its walls, to the great impairment of the efficiency of the joint.

Figure 1:
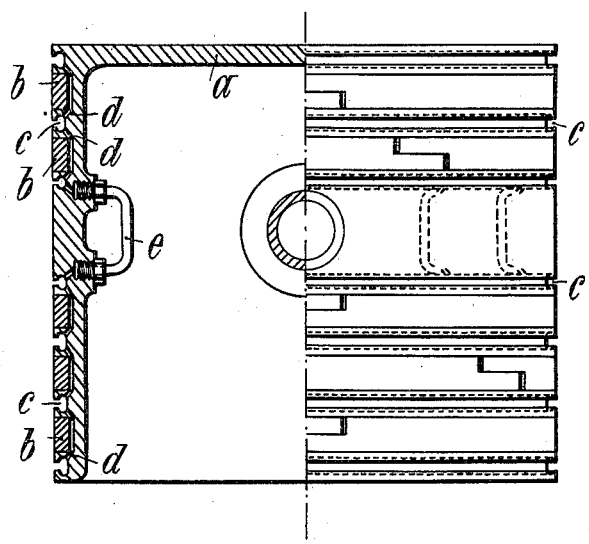
Figure 2:
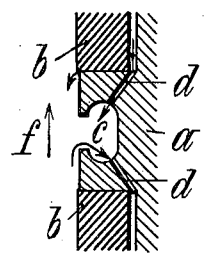

The lubricating device which forms the object of the present invention has for its object to obviate these defects and is represented by way of example in one of its embodiments in the accompanying drawing, in which:

Figure 1 is a semi elevation and semi longitudinal section of a piston comprising this device. Fig. 2 is a diagram illustrating its operation.

In accordance with the invention, the cylindrical wall of a piston $a$ comprises between its segments $b$ channels $c$ the opposite edges of each of which are formed with sharp ridges and constitute a continuation of grooves formed in each of the lateral walls of the corresponding channel. The oblique holes $d$ are formed in these grooves to place them in communication with the bottom of the cavities which serve as housings for the adjacent segments. The holes $d$ in each groove may vary in number as desired and the holes of the two grooves of one and the same channel are formed alternately with opposite obliquities in such a manner as to constitute throughout the lubricant circulation thus established series of conduits dividing the entire cylindrical surface of the piston into suitably distributed zones all of which are intercommunicating.

For the special case of the application of the device to the piston of an explosion motor not furnished with segments at the places at which the ends of the shaft connecting the said piston with the big end of the connecting rod for example, the bottoms of the two segments which are located on either side of this shaft communicate with channels $c$ arranged between the said segments and the shaft, which channels communicate one with the other by means of conduits $e$, which are either formed in the thickness of the wall of the piston or constituted by pipes suitably connected with the holes to be placed in communication as shown by way of example in Fig. 1.

In accordance with these arrangements, when the piston moves in one direction, that indicated by the arrow $f$ (Fig. 2) for example, the whole of the lubricant encountered by the first segment in front of it, is forced into the channel preceding it; it then passes through the conduits $d$ to the rear of the segment the lateral frictional walls of which it lubricates and partly spreads against the wall of the cylinder. The portion of the lubricant which remains behind the segment flows into the following channel, while the portion which issues at each side of the first segment is taken up by the following segment and collected in the channel which precedes this segment and passes through this same channel to the rear of the said segment. The same cycle continues at each segment during the whole stroke of the piston in one direction and also during the stroke of the piston in the opposite direction, but inversely.

All the lubricant that flows from the extreme segments at each of the strokes of the piston, spreads over the walls of the cylinder and passes in successive quantities, half between the segments and the said walls and half behind these segments.

Accordingly, by means of a continuous circulation of the lubricant, this device provides perfect lubrication of the piston on all its frictional parts, without the possibility of the accumulation of resinified substances as has hitherto been the case.

In cases in which it is desirable not to allow the lubricant to pass to the acting face of the piston the extremities of the conduits situated on this side can be closed.

What I claim and desire to secure by Letters Patent of the United States is:—

1. In a piston for explosion motors provided with segments, circular channels between each of the segments and between the segments and the two extremities of the piston and small capillary conduits connecting each of said circular channels with the housings of said segments in such a manner that the lubricant which is collected by the channels circulates freely and successively from one segment to the other between the two extremities of the piston.

2. In a piston for explosion motors provided with segments, circular channels between each of the segments and between the segments and the two extremities of the piston, said circular channels being provided with chamfered edges facilitating the collection of the lubricant, and small capillary conduits connecting each of said circular channels with the housings of said segments in such a manner that the lubricant which is collected by the channels circulates freely and successively from one segment to the other between the two extremities of the piston.

In testimony whereof I affix my signature in presence of two witnesses.

GUSTAVE HENRI TRÉMOLIÈRES.

Witnesses:
H. C. COXE,
GEORGES BONNEUIL.